Sept. 5, 1950 W. N. SMITH 2,521,132
TRAILER HITCH
Filed Jan. 31, 1948 2 Sheets-Sheet 2
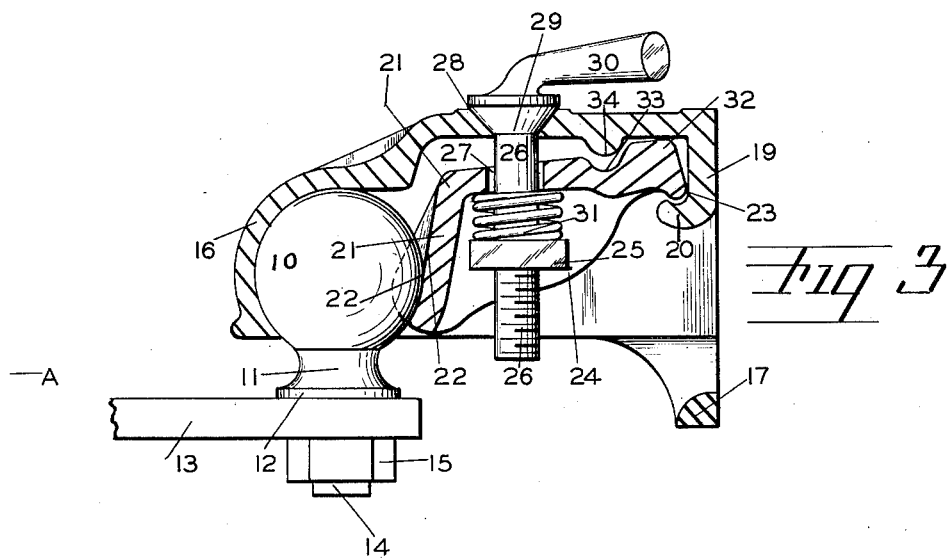
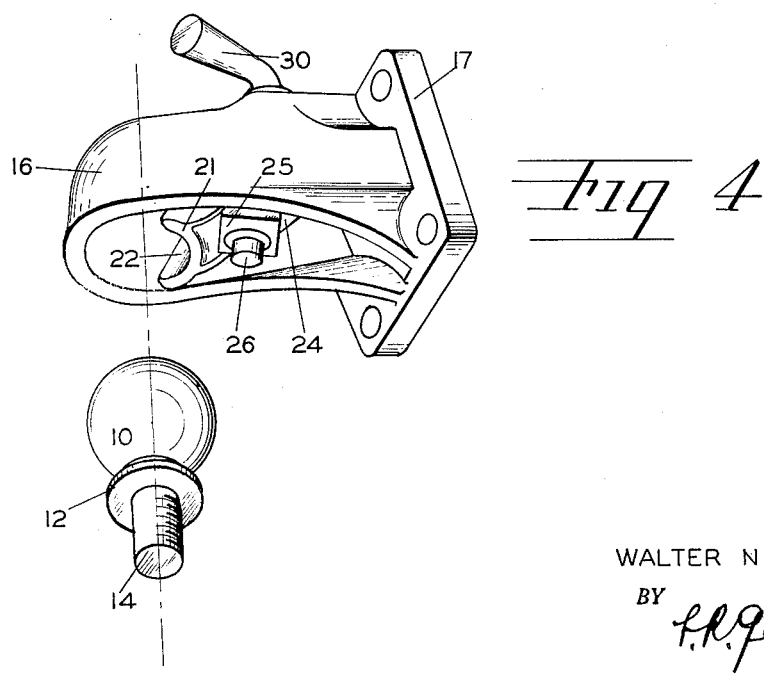
INVENTOR.
WALTER N SMITH
BY
*F. R. Geisler*
ATTORNEY Patented Sept. 5, 1950

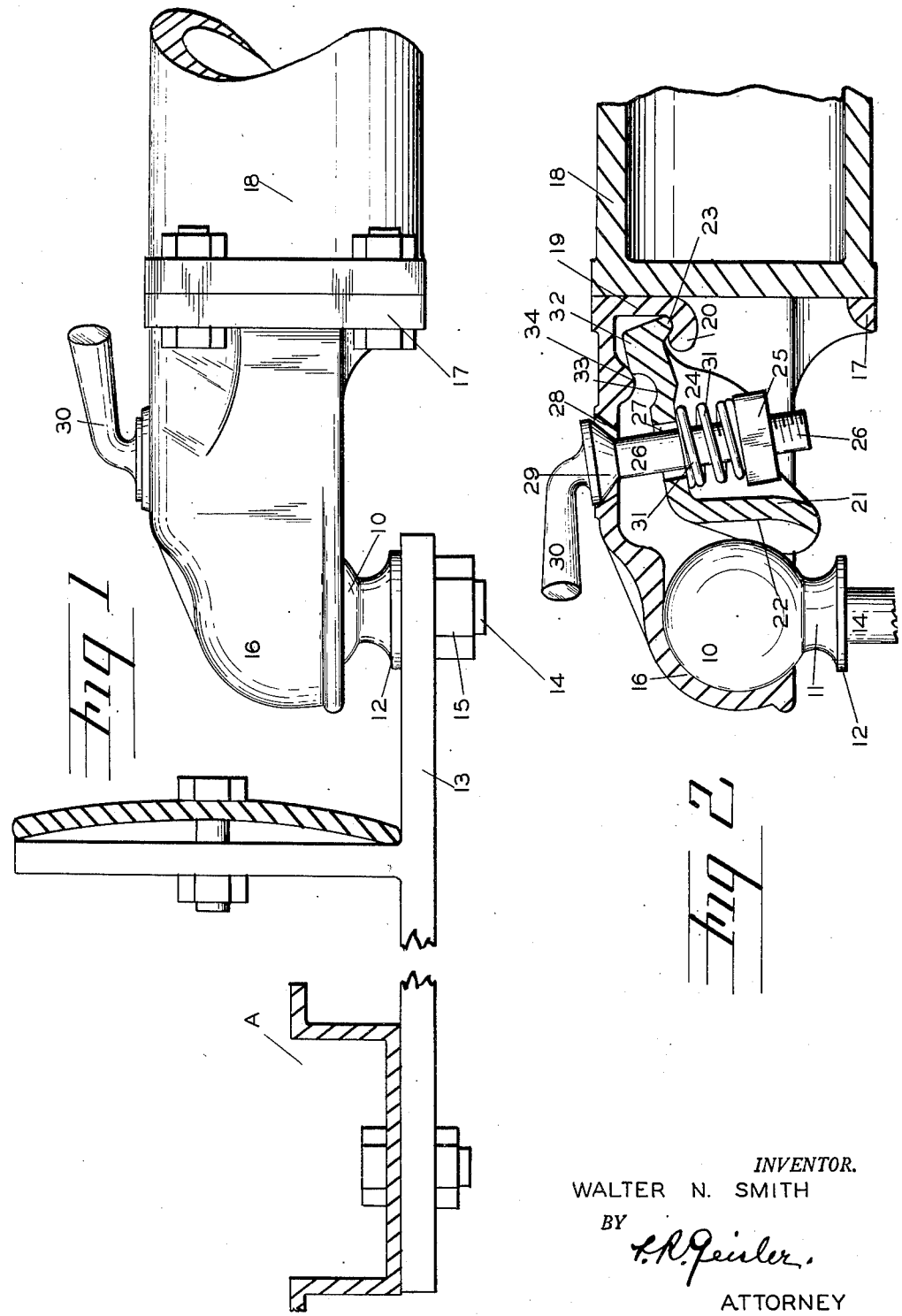

2,521,132

UNITED STATES PATENT OFFICE 2,521,132

TRAILER HITCH

Walter N. Smith, Portland, Oreg.

Application January 31, 1948, Serial No. 5,591

3 Claims. (Cl. 280—33.17)

This invention relates in general to couplers or hitches for connecting a trailer to a motor vehicle, and relates more specifically to a hitch of the ball and socket type in which a ball member may be detachably mounted within the socket member and be movable in the socket member when prevented from being demounted or removed from the socket member.

One of the objects of this invention is to provide an improved hitch of the character above indicated in which any excessive play or vibration of the ball member within the socket member, when the hitch is in coupled position, will be prevented.

Another object of this invention is to provide a ball and socket hitch in which a desired and predetermined amount of freedom of rotation of the ball member, when the hitch is in coupled or locked position, can be established and maintained, so as to prevent excessive wear of the respective parts.

A further object of this invention is to provide an improved ball and socket hitch in which very accurate adjustment can be made easily when required for compensating for gradual wear of the members.

A still further and specific object of this invention is to provide a ball and socket hitch in which a locking-jaw element will be mounted within the socket and in which the positioning of the same will be controlled by simplified and novel means.

An additional object is to provide a trailer hitch of simple and practical construction which will be inexpensive to manufacture and thus which can be placed on the market at a very moderate price and which will be quick and easy to operate.

These objects and incidental advantages I attain by adding to the socket member of my hitch, a simple locking-jaw element with a novel locking control means for the same and by forming the members and parts of the hitch substantially as hereinafter briefly described, in which description reference is to be made to the accompanying drawings.

In the drawings:

Fig. 1 is a side elevation of the entire hitch, showing the same in coupled or locked position, thus for example, in use in coupling a trailing vehicle to an automobile or leading vehicle;

Fig. 2 is an enlarged vertical longitudinal section of the hitch members showing the same in position for being coupled or locked together;

Fig. 3 is a similar section showing the members in final coupled position; and

Fig. 4 is a perspective view of the socket member of the hitch, showing the bottom portion of the locking-jaw within the socket, and showing the ball member by itself, both members being shown alone and detached.

The ball member 10 of the hitch is carried on the customary integral supporting stem 11, having a flange 12 for engaging the top of the draw bar 13 of the leading vehicle A, and having an integral depending bolt shank 14 of reduced diameter which extends through the draw bar 13 and which is held against displacement by the nut 15. The ball member 10 can, of course, be attached to the vehicle in any other suitable manner or by any other suitable means, depending upon the style and design of the automobile or vehicle to which the ball member of the hitch is to be secured.

The socket member consists of a downwardly-opening shell 16, which, in the embodiment of my invention illustrated in the drawings, is formed with an integral rear flange 17 (Fig. 4) by means of which the socket member can be bolted to the front end of a tongue 18 of the trailer vehicle, as illustrated in Fig. 1. An integral rear wall 19 (Figs. 2 and 3) extends across the upper portion of the shell 16 and is formed with a horizontal, inwardly extending, rounded lip 20, the purpose of which will be explained later. The forward portion of the shell 16, which forms a downwardly-opening socket for the ball and socket joint, has its interior face shaped into a surface which corresponds in part to a spherical contour of the ball member 10 and is of such depth as to permit inclosing the ball member to a point substantially below its center when the ball member and socket member are in coupled position.

A locking block or jaw element 21, located within the socket shell, has its forward face 22 also shaped to conform in part to the spherical contour of the ball member 10 when the hitch is in coupled position. The rear of the locking block 21 terminated at the bottom in a downwardly-extending lip 23 adapted to rest in the groove of the lip 20 of the rear wall of the socket member, thus enabling the rear end of the locking block to be pivotally or rockably supported on the rear wall 19 of the socket member and to have a portion of the rear end of the locking block always bearing against the rear wall of the socket member as long as the locking block is contained within the socket member, whether the locking block is in the open position of Fig. 2 or in the locked position of Fig. 3.

The locking block 21 is formed with a cavity 24 which is open at the bottom and the two side walls of this cavity are vertical and parallel. The cavity 24 is of sufficient size in cross section to accommodate freely a square nut 25, carried on the lower threaded end of an adjusting screw 26, while at the same time preventing any turning of the nut 25. An enlarged hole 27 extends through the top of the locking block 21 into the cavity 24 to accommodate the adjusting screw 26. The top of the socket shell 16 is provided with a circular opening 28 through which the adjusting screw 26 extends.

The stem of the adjusting screw 26 is enlarged near the top, the enlarged portion 29 being formed with a frusto-conically shaped surface, as shown in Figs. 2 and 3, and the opening 28 through the top of the socket shell is correspondingly formed with a cooperating or co-acting frusto-conical bearing surface for the enlarged portion of the adjusting screw 26. The purpose of this arrangement of bearing surfaces will be explained later. The adjusting screw 26 terminated at its upper end in a handle or small lever arm 30, by means of which the adjusting screw can be easily manipulated.

A coil spring 31 is carried on the stem of the adjusting screw 26 within the cavity of the locking block 21, and is held by the nut 25 and the top of the locking block within the cavity. The location of this spring 31 is an important feature of my improved hitch, as will later be apparent. The top surface of the locking block 21 is formed with a raised rear portion 32 adjoining a transversely-extending groove 33 and the inner face of the top portion of the socket shell has a rib 34 adapted to engage the front edge of portion 32 under certain conditions and to extend part way into the groove 33 should the wear on the parts of the hitch permit the locking block to be raised to within close proximity of the top of the socket shell.

The operation of my hitch is as follows: When the hitch is to be coupled, the adjusting screw 26 is loosened sufficiently to permit the locking block 21 to drop to the lower position illustrated in Fig. 2, thus enabling the ball member 10 to be freely and easily inserted in the socket shell as shown. This loosening of the adjusting screw 26 is done quickly and simply by giving the lever handle 30 a few turns. The locking block 21 rocking on the lip 20, swings downwardly to the extent desired without becoming entirely disconnected from the socket shell housing and thus without getting out of place in the socket. Even if the screw 26 should inadvertently be loosened to the extent that the nut 25, and with it the spring 31, drops off the screw, the locking block 21 would be held loosely between the lip 20 and the top rib 34 and the stem of the screw 26, and would not drop out of the socket unless the screw were lifted out from the socket entirely or unless the locking block were given an extra pull.

When the ball member 10 has been inserted in the socket in the position illustrated in Fig. 2, the adjusting screw 26 is tightened by turning the handle 30. This compresses the spring 31 and raises the locking block 21 and causes the ball member to be drawn into the coupled position shown in Fig. 3.

In a ball and socket hitch it is desirable to have the socket fit sufficiently tightly around the ball to prevent any back and forth movement or knocking of the ball in the socket, and also of course there should not be any back and forth movement or knocking of the locking block in the socket. However, the engagement between the ball and socket should not be so tight as to interfere with a certain amount of necessary turning of the ball within the socket when the two hitched vehicles are traveling on the road, or should not be tight enough to produce undue frictional wear on the ball and socket members. The tightness with which the ball member is gripped, when the hitch is in coupled position, can be given minute adjustment by a slight turn of the adjusting screw handle 30. If desired, radial lines can be marked on top of the housing shell 16 around the hole 28 and an indicator mark can be placed at the base of the handle 30, so that the handle and screw can be set in any definite predetermined position each time the hitch is coupled. When the hitch is in coupled position, the locking block 21 will bear against the rear wall 19 of the socket shell and, under extreme conditions of wear, will also bear against the top rib 34 of the shell, and thus even though the locking block is lifted slightly above the lip 20 the block will be held firmly against back and forth movement within the socket and will exert the necessary wedging action against the ball member.

The positioning of the spring 31 in the cavity 24 between the nut 25 and the top wall of the locking block 21 enables the locking block to be held in locking or wedging position by adjustable spring pressure means, and the spring action reduces the likelihood of the locking block being set either too tightly or too loosely in locking position when the hitch is coupled. The spring 31 also serves another important function in that the spring, being under constant compression between the nut 25 and the top wall of the locking block 21 when the hitch is in coupled position, assures a constant downward pull on the stem of the adjusting screw 26. In other words, when the hitch is in coupled position the frusto-conical bearing surface of the enlarged portion 29 of the adjusting screw 26 will always be pressed against the corresponding bearing surface about the hole 28 in the top of the socket shell 16 and the two frusto-conical bearing surfaces will be held in frictional engagement. This engagement of these two bearing surfaces under the constant downward pull on the stem of the adjusting screw will prevent any turning of the screw 26 and handle 30, when the hitch is in coupled position, unless the handle 30 is purposely turned by hand. Thus any tendency of the screw 26 gradually to work loose during the operation of the hitch in coupled position will be prevented.

In other ball and socket hitches which I have observed it has been necessary to provide more complicated means, such as ratchet teeth and pawl, to prevent inadvertent and undesired turning of the adjusting or locking screw. Thus in my improved hitch the adjusting screw remains set in any desired predetermined position when the ball and socket members are coupled. Any slight adjustment, such as compensation for wear of the parts, can be obtained merely by giving a slight turn to the handle 30, and uncoupling of the ball and socket members is accomplished with a minimum expenditure of time and labor.

Minor modifications could be made in my hitch without departing from the principle of my invention. For example, in place of a continuous horizontal lip 20 at the rear wall of the socket shell, a pair of lugs in horizontal transverse alignment could be substituted to provide equivalent means for rockably supporting the rear end of the locking block. Other cooperating and frictional-engaging bearing surfaces of the adjusting screw and the top of the socket shell could be substituted in place of the frusto-conical surfaces which I have described and illustrated. However, the particular form of construction which I have shown I consider to be my preferred form for my improved hitch. It is not my intention, however, to limit my invention except as set forth in the claims.

I claim:

1. In a trailer hitch of the character described, a ball member adapted to be connected to one vehicle, a socket shell member adapted to be connected to the other vehicle, and a locking block located within said socket shell member, means on the inside wall of said socket shell opposite that portion of said shell receiving said ball member for pivotally and removably supporting the corresponding end of said locking block, a downwardly opening cavity in said locking block, an adjusting screw extending through a hole in the top of said socket shell and through a hole in the top of said locking block into said cavity, a nut on the bottom end of said screw, a coil spring on said screw between said nut and the top of said locking block within said cavity, means in said locking block for holding said nut against turning, an enlarged diameter portion at the upper end of said screw, a bearing surface in the top of said socket shell around said first mentioned hole, a corresponding and coacting bearing surface formed on the underside of said enlarged diameter portion of said screw for engagement with said first mentioned bearing surface, whereby when a downward pull is exerted on said screw said bearing surfaces will be in frictional engagement with each other to resist turning tendency on the part of said screw, the pressure of said locking block against said spring and nut resulting in a downward pull being constantly exerted on said screw whenever said hitch is in coupled position, thereby maintaining said frictional engagement of said coacting bearing surfaces, and means on the top end of said screw for facilitating manual turning of said screw in adjusting said pressure and the pressure of said locking block against said ball member.

2. In a trailer hitch of the character described, a ball member adapted to be connected to one vehicle, a socket shell member adapted to be connected to the other vehicle, and a locking block located within said socket shell member, a lip on the inside of said socket shell opposite that portion of said shell receiving said ball member for pivotally and removably supporting the corresponding end of said locking block, a downwardly opening cavity in said locking block, an adjusting screw extending through a hole in the top of said socket shell and through a hole in said locking block into said cavity, a nut on the bottom end of said screw, a coil spring on said screw between said nut and said locking block within said cavity, an enlarged diameter portion at the upper end of said screw, a frusto-conical bearing surface in the top of said socket shell around said first mentioned hole, a corresponding coacting bearing surface formed on the under side of said enlarged diameter portion of said screw for engagement with said first mentioned bearing surface, whereby when a downward pull is exerted on said screw said bearing surfaces will be in frictional engagement with each other to resist turning tendency on the part of said screw, and a handle on the top end of said screw to facilitate manual adjustment of said screw, the pressure of said locking block against said spring and nut resulting in a downward pull being constantly exerted on said screw whenever said hitch is in coupled position, and thereby maintaining said frictional engagement of said coacting bearing surfaces.

3. A trailer hitch of the character described comprising a ball member adapted to be connected to a leading vehicle, a socket shell member adapted to be connected to the trailing vehicle, and a locking block located within said socket shell member, a portion of the interior surface of said socket member and a portion of the surface of said locking block corresponding in part to the surface of said ball member so as to form a socket for said ball member when said hitch is in coupled position, a lip on the inside wall of said socket shell opposite that portion of said shell receiving said ball member for pivotally and removably supporting the corresponding end of said locking block, a downwardly opening cavity in said locking block, an adjusting screw extending through a hole in the top of said socket shell and through a hole in the top of said locking block into said cavity, a nut on the bottom end of said screw, a coil spring on said screw between said nut and the top of said locking block within said cavity, an enlarged diameter portion at the upper end of said screw, a frusto-conical bearing surface on the top of said socket shell around said first mentioned hole, a similar and coacting bearing surface formed on the underside of said enlarged diameter portion of said screw for engagement with said first mentioned bearing surface, whereby when a downward pull is exerted on said screw said bearing surfaces will be in frictional engagement with each other and to resist turning tendency on the part of said screw, and a handle on the top end of said screw to facilitate manual adjustment of said screw, the pressure of said locking block against said spring and nut resulting in a downward pull being constantly exerted on said screw whenever said hitch is in coupled position, and thereby maintaining said frictional engagement of said coacting bearing surfaces.

WALTER N. SMITH.

REFERENCES CITED

The following references are of record in the file of this patent:

UNITED STATES PATENTS

| Number | Name | Date |
|---|---|---|
| 1,978,859 | Draeger | Oct. 30, 1934 |
| 2,170,980 | Thorp et al. | Aug. 29, 1939 |
| 2,189,710 | Draeger | Feb. 6, 1940 |
| 2,197,267 | Gilmore | Apr. 16, 1940 |
| 2,435,857 | Werner | Feb. 10, 1948 |
| 2,439,967 | Dollase | Apr. 20, 1948 |